United States Patent
Kwon et al.

(10) Patent No.: US 9,099,136 B2
(45) Date of Patent: *Aug. 4, 2015

(54) METHOD AND SYSTEM FOR HARD DISK DRIVE THROUGHPUT OPTIMIZATION USING POSITION ERROR SIGNALING

(71) Applicant: Dell Products L.P., Round Rock, TX (US)

(72) Inventors: Haesung Kwon, Austin, TX (US); Frank Widjaja Yu, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/452,706

(22) Filed: Aug. 6, 2014

(65) Prior Publication Data

US 2014/0340787 A1    Nov. 20, 2014

Related U.S. Application Data

(63) Continuation of application No. 13/736,547, filed on Jan. 8, 2013, now Pat. No. 8,824,088.

(51) Int. Cl.
*G11B 15/18* (2006.01)
*G11B 5/596* (2006.01)
*G11B 5/55* (2006.01)

(52) U.S. Cl.
CPC .......... *G11B 5/59694* (2013.01); *G11B 5/5582* (2013.01)

(58) Field of Classification Search
None
See application file for complete search history.

(56) References Cited

U.S. PATENT DOCUMENTS

| | | | |
|---|---|---|---|
| 5,805,373 A | 9/1998 | Hara et al. | 360/77.07 |
| 6,545,836 B1 * | 4/2003 | Ioannou et al. | 360/77.06 |
| 7,116,513 B1 | 10/2006 | Sun et al. | 360/77.02 |
| 7,564,641 B2 | 7/2009 | Kamimura et al. | 360/75 |
| 8,315,006 B1 | 11/2012 | Chahwan et al. | 360/75 |
| 8,824,088 B2 * | 9/2014 | Kwon et al. | 360/75 |
| 2001/0036026 A1 | 11/2001 | Chen et al. | 360/77.02 |
| 2001/0036035 A1 * | 11/2001 | Morris et al. | 360/78.05 |
| 2003/0223144 A1 | 12/2003 | Smith et al. | 360/75 |
| 2005/0088774 A1 | 4/2005 | Bahirat et al. | 360/77.02 |
| 2006/0075283 A1 | 4/2006 | Hartung et al. | 714/5 |
| 2006/0176004 A1 | 8/2006 | Hosono et al. | 318/632 |
| 2007/0064334 A1 | 3/2007 | Jia et al. | 360/77.02 |
| 2007/0070540 A1 | 3/2007 | Noguchi et al. | 360/75 |
| 2007/0291399 A1 | 12/2007 | Kamimura et al. | 360/75 |
| 2009/0034116 A1 | 2/2009 | Iigashino et al. | 260/78.06 |
| 2009/0067080 A1 | 3/2009 | Gross et al. | 360/71 |
| 2010/0061007 A1 | 3/2010 | Matsushita et al. | 360/68 |
| 2013/0223496 A1 | 8/2013 | Buhl et al. | 375/224 |

OTHER PUBLICATIONS www.lintech.org ; "Computer Peripherals: Chapter 10—Hard Disk Drives," http://www.lintech.org/comp-per/10HDDISK.pdf; pp. 21, 2001.

* cited by examiner

*Primary Examiner* — Thang Tran
(74) *Attorney, Agent, or Firm* — Baker Botts L.L.P.

(57) ABSTRACT

Systems and methods are provided for throughput optimization of a hard disk drive (HDD) using position error signaling (PES) that includes determining a PES for a HDD mounted in a chassis based on a dynamic disturbance. The method also includes calculating a critical parameter of the PES. The method further includes indicating a mechanical design modification of the HDD or the chassis if the critical parameter of the PES exceeds a pre-defined threshold.

21 Claims, 4 Drawing Sheets

METHOD AND SYSTEM FOR HARD DISK DRIVE THROUGHPUT OPTIMIZATION USING POSITION ERROR SIGNALING

CROSS-REFERENCE TO RELATED APPLICATION

The present application is a continuation application of copending U.S. patent application Ser. No. 13/736,547 filed Jan. 8, 2013, which is hereby incorporated by reference in its entirety for all purposes.

TECHNICAL FIELD

The present disclosure relates in general to information handling systems, and more particularly to a method and system for hard disk drive throughput optimization using position error signaling.

BACKGROUND

As the value and use of information continues to increase, individuals and businesses seek additional ways to process and store information. One option available to users may be information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information may be handled, how the information may be handled, how much information may be processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications.

Information handling systems may include one or more computer systems, data storage systems, and/or networking systems that have a variety of hardware and/or software components configured to process, store, and/or communicate information. In order to process, store and manage the information, a hard disk drive or other storage medium may be included in the information handling system. As information handling systems become more compact and complex, various issues have occurred.

As an example, information handling systems may depend on one or more hard disk drives to store information. Hard disk drives generally have one or more magnetic disks that provide persistent storage of information. The hard disk drives are typically mechanically mounted in drive bays of an information handling system chassis. During normal operation, dynamic disturbances may be introduced into the chassis due to fan-induced vibrations, adjacent drive vibrations, environmental-induced vibrations, thermally-induced vibrations, and other sources of turbulence. Hard disk drive throughput may be impacted by these dynamic disturbances, which may result in errors in data storage, management, and/or communications.

SUMMARY

In accordance with the teachings of the present disclosure, disadvantages and problems associated with hard disk drive throughput and dynamic disturbances may be substantially reduced or eliminated.

In accordance with one embodiment of the present disclosure, a method is provided for throughput optimization of a hard disk drive (HDD) using position error signaling (PES) that includes determining a PES for a HDD mounted in a chassis based on a dynamic disturbance. The method also includes calculating a critical parameter of the PES. The method further includes indicating a mechanical design modification of the HDD or the chassis if the critical parameter of the PES exceeds a pre-defined threshold.

In accordance with another embodiment of the present disclosure, a HDD may include a processor configured to determine a PES for the HDD mounted in a chassis based on a dynamic disturbance. The processor also may be configured to calculate a critical parameter of the PES. The processor may be further configured to indicate a mechanical design modification of the HDD or the chassis if the critical parameter of the PES exceeds a pre-defined threshold.

In accordance with another embodiment of the present disclosure, an information handling system may include a processor and a HDD communicatively coupled to the processor. The information handling system may further include a computer-readable medium communicatively coupled to the processor and having stored thereon instructions configured to, when executed by the processor, determine a PES for a HDD mounted in a chassis based on a dynamic disturbance. The instructions also may be configured to calculate a critical parameter of the PES. The instructions may be further configured to indicate a mechanical design modification of the HDD or the chassis if the critical parameter of the PES exceeds a pre-defined threshold.

Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1-4, wherein like numbers are used to indicate like and corresponding parts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage resource, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing.

Figure 1:
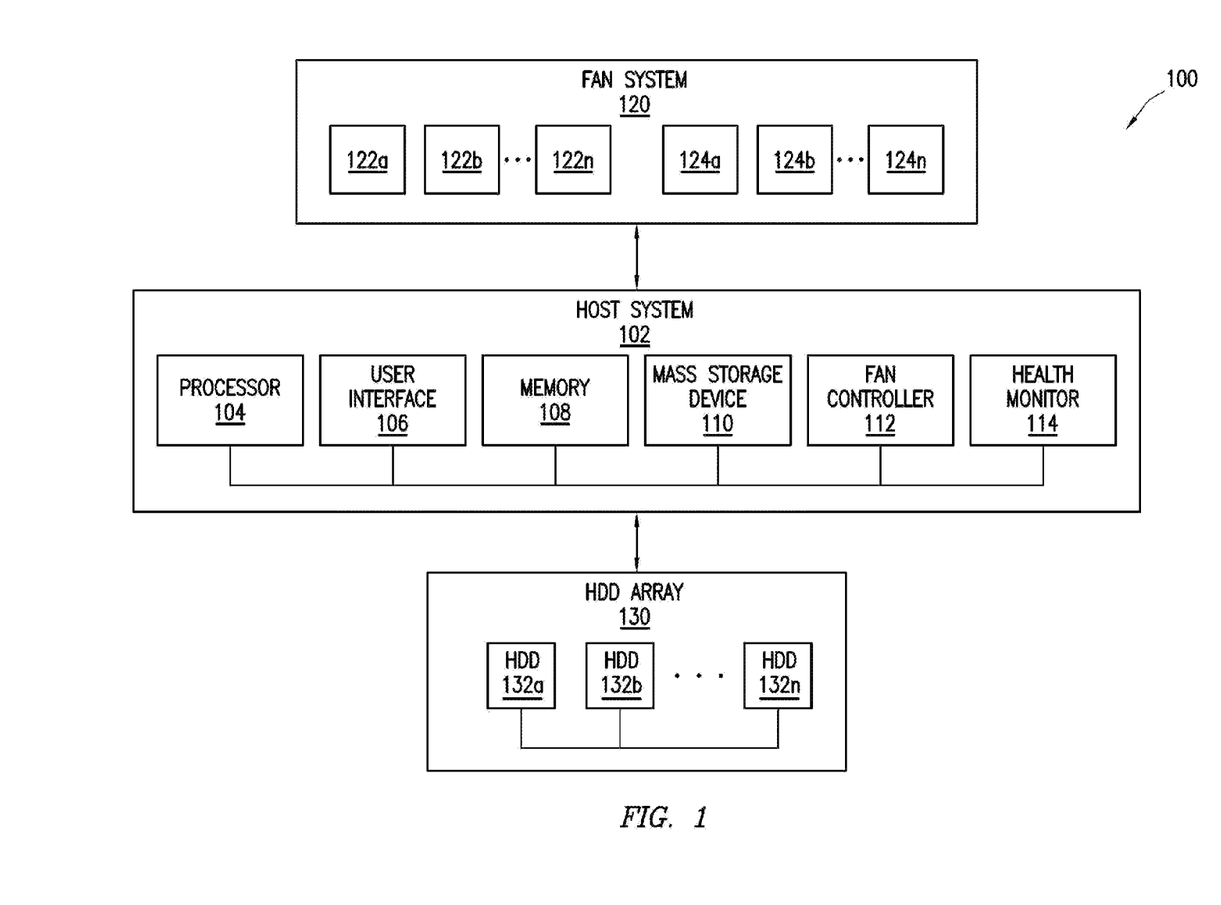
FIG. 1 illustrates a block diagram of an example information handling system, in accordance with certain embodiments of the present disclosure.

FIG. 1 illustrates a block diagram of an example information handling system (IHS) 100, in accordance with certain embodiments of the present disclosure. IHS 100 may generally be operable to receive data from, and/or transmit data to, other IHSs 100. In one embodiment, IHS 100 may be a personal computer adapted for home use. In the same or alternative embodiments, IHS 100 may be a personal computer adapted for business use. In the same or alternative embodiments, IHS 100 may be a storage array or a server configured to include multiple storage resources (e.g., hard drives) in order to manage large amounts of data. In some embodiments, IHS 100 may include host system 102, fan system 120, and hard disk drive (HDD) array 130.

Host system 102 may be a host computer, a remote system, and/or any other computing system communicatively coupled to HDD array 130 and fan system 120. Host system 102 may include, among other suitable components, processor 104, user interface 106, memory 108, mass storage device 110, fan controller 112, and/or health monitor 114.

Processor 104 may include any system, device, or apparatus operable to interpret and/or execute program instructions and/or process data. Processor 104 may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 104 may interpret and/or execute program instructions and/or process data stored in memory 108, mass storage device 110, fan controller 112, health monitor 114, and/or another component of IHS 100.

User interface 106 may be communicatively coupled to processor 104 and may include any instrumentality or aggregation of instrumentalities by which a user may interact with IHS 100. For example, user interface 106 may permit a user to input data and/or instructions into IHS 100 (e.g., via a keyboard, pointing device, and/or other suitable means), and/or otherwise manipulate IHS 100 and its associated components. User interface 106 may also permit IHS 100 to communicate data to a user, e.g., by means of a display device.

Memory 108 may be communicatively coupled to processor 104 and may include any system, device, or apparatus operable to retain program instructions or data for a period of time (e.g., computer-readable media). Memory 108 may include random access memory (RAM), electrically erasable programmable read-only memory (EEPROM), a PCMCIA card, flash memory, magnetic storage, opto-magnetic storage, or any suitable selection and/or array of volatile or nonvolatile memory that retains data after power to IHS 100 is removed.

Mass storage device 110 may include one or more storage resources (or aggregations thereof) communicatively coupled to processor 104 and may include any system, device, or apparatus operable to retain program instructions or data for a period of time (e.g., computer-readable media). In some embodiments, mass storage device 110 may be a component of HDD array 130. Mass storage device 110 may retain data after power to IHS 100 is removed. Mass storage device 110 may include one or more HDDs, magnetic tape libraries, optical disk drives, magneto-optical disk drives, compact disk drives, compact disk arrays, disk array controllers, solid state drives (SSDs), and/or any computer-readable medium operable to store data.

Fan controller 112 may be communicatively coupled to processor 104 and may be configured to control and/or monitor one or more components of fan system 120. Fan controller 112 may include, without limitation, a microprocessor, microcontroller, DSP, ASIC, or any other digital or analog circuitry configured to interpret and/or execute program instructions and/or process data related to controlling fan system 120. In some embodiments, fan controller 112 may control the speed of oscillating speed fans.

Fan system 120 may include one or more fans communicatively coupled to processor 104, fan controller 112, and/or any other component of host 102. Fan system 120 may be mounted in a chassis and used for ventilating heated air from the interior of the chassis. Fan system 120 may include one or more constant speed fans 122a, 122b, 122n (referred to collectively as constant speed fans 122) and/or oscillating speed fans 124a, 124b, 124n (referred to collectively as oscillating speed fans 124). Fan controller 112 may enable the operation of oscillating speed fans 124 by varying the voltage across oscillating speed fans 124.

In fan system 120, oscillating speed fans 124 may be operated over a specified range of speed and constant speed fans 122 may be operated at a specified fixed speed. For example, fan controller 112 may be designed to produce a duty cycle between approximately 95% and 100% for varying the voltage across oscillating speed fans 124. A duty cycle in this range may result in oscillating speed fans 124 operating between approximately 950 revolutions per minute (RPM) and 1000 RPM. Because constant speed fans 122 may be subjected to a fixed voltage, they may operate at a constant speed of approximately 1000 RPM. The speed of oscillating speed fans 124 may be based on a temperature within IHS 100. For example, a temperature sensor may measure a temperature above a threshold and that temperature may be communicated to fan controller 112, which may adjust the speed of one or more oscillating speed fans 124. Further, the speed of each oscillating speed fan 124 may be adjusted individually or the speed of multiple oscillating speed fans 124 may be adjusted collectively.

Health monitor 114 may be communicatively coupled to processor 104 and may be configured to control and/or monitor one or more components of HDD array 130. Health monitor 114 may be operable to analyze data and determine, based on parameters such as throughput or error, the health, reliability, quality, and/or expected useful life of one or more of HDDs 132. In some embodiments, health monitor 114 may be a Self-Monitoring, Analysis and Reporting Technology (SMART) monitor and/or any other suitable device for monitoring the health of HDDs 132. In some embodiments, the functionality of health monitor 114 may be embodied within processor 104. In some embodiments, health monitor 114 may include, without limitation, a microprocessor, microcontroller, DSP, ASIC, or any other digital or analog circuitry configured to interpret and/or execute program instructions and/or process data related to controlling and/or monitoring HDD array 130. Health monitor 114 may be configured to issue, receive, and/or process command codes, diagnostic data, setup data and/or configuration parameters to and/or from HDD array 130 and/or processor 104 in order to monitor and/or diagnose the health, reliability, quality, and/or expected useful life of any of HDDs 132.

HDD array 130 may include one or more HDDs 132a, 132b, 132n (collectively referred to as HDDs 132). HDDs 132 may be communicatively coupled to each other and may be communicatively coupled to host 102. In some embodiments, HDDs 132 may be mounted within a chassis and configured such that fan system 120 may be used for ventilating heated air generated by the operation of HDDs 132 from the interior of the chassis. HDD array 130 may be mounted in a chassis and/or enclosure separate from host 102 and/or fan system 120. In other embodiments, HDD array 130 may be mounted in the same chassis and/or enclosure as host 102 and/or fan system 120. HDDs 132 may be mounted in bays, slots, and/or any other suitable support in a chassis. Further, HDD array 130 and individual HDDs 132 may experience dynamic disturbances due to the operation and/or proximity of fan system 120, oscillating speed fans 124, and/or constant speed fans 122.

In operation, dynamic disturbances may impact the accuracy of reads from and/or writes to HDDs 132. Impact of dynamic disturbances may include decreases in HDDs 132 throughput performance, which may correspondingly impact the throughput of servers and data storage. For example, a dynamic disturbance may temporarily displace internal components of HDD 132, as discussed in more detail below with reference to FIGS. 2 and 3, and may cause delays as the internal components reset. Further, as HDDs 132 increase in density, e.g., with more tracks incorporated on disks as discussed below with reference to FIGS. 2 and 3, handling of dynamic disturbances in systems may become increasingly critical. Higher track densities may require increases in accuracy when searching for tracks and the effects of dynamic disturbances may be more pronounced. Dynamic disturbances may include fan-induced vibration, environmental-induced vibration (e.g., earthquakes, accidental movement external to the HDD, such as, the movement of a laptop computer), thermally-induced vibrations, vibrations from other HDDs 132, and/or other sources of mechanical vibrations to IHS 100. For example, HDD 132 positioned near a fan (e.g., constant speed fans 122 and/or oscillating speed fans 124) may experience vibrations due to the operation and associated vibration of the fan.

In some embodiments, position error signaling (PES) may be utilized to provide an accurate measure of the impact of dynamic disturbances on HDD 132. As discussed in more detail below with reference to FIGS. 2 and 3, the PES may be a measurement indicating the offset between the position of the center of the head of HDD 132 and the center of the track to be read. The PES may be a signal proportional to the relative difference between the position of the center of the head of HDD 132 and the nearest track center. For example, a critical parameter of PES may be defined as the track misregistration amount in time and/or frequency domains between read/write elements in a head and data/server tracks in a disk. Thus, the PES may be a periodic function of stationary and ideal track center. The PES may be determined by applying an algorithm to data received from internal accelerometers located inside HDD 132. The PES measurements may be taken either in-situ via an analog signal or may be transferred to a log file, which may be in text format based on frequency bands. The PES may be expressed in a percent of track offset (% track) and raw data may be normalized by determining the three sigma mean in % track.

In some embodiments, the PES may be used to configure HDDs 132 in a chassis with reference to the location of fans (e.g., constant speed fans 122 and/or oscillating speed fans 124), and/or with reference to fan speed. As shown in the table below, a critical parameter, such as the three sigma mean in % track, may be determined for a series of HDDs 132 located in different slots of a chassis based on fan operation, such as oscillating speed fans 124, operating at full speed or RPM (e.g., 100%) or at a speed based on a threshold temperature (e.g., auto):

TABLE 1

| Slot | PES 3σ Mean in % Track | |
|---|---|---|
| | Fan speed = 100% | Fan speed = Auto |
| 1 | 7.8 | 6.8 |
| 2 | 7.6 | 6.6 |
| 3 | 8.5 | 6.7 |
| 4 | 8.0 | 6.8 |
| 5 | 8.4 | 6.9 |
| 6 | 8.2 | 6.8 |

Table 1 illustrates that the slot location may impact the magnitude of the PES and accordingly the impact of any dynamic disturbances. For example, HDD 132 installed in slot three may experience a higher degree of dynamic disturbance based on the fans operating at approximately 100% than HDD 132 installed in slot two. However, the relative difference of dynamic disturbance between HDDs 132 installed in slots two and three may decrease when the fans operate in auto mode. In some embodiments, correlations may be made between the PES data and a slot location of a particular HDD, other HDDs located near a particular HDD, the speed of a fan, the location of a fan, the throughput of a particular HDD, and/or any other suitable characteristic. Based upon any correlations that may be determined, mechanical design modifications may be made to a particular HDD, a chassis, a fan, and/or any other suitable component of IHS 100 to decrease the PES and thereby, improve the performance, reliability, quality, and/or expected life of a particular HDD 132, HDD array 130, and/or IHS 100.

Figure 2:
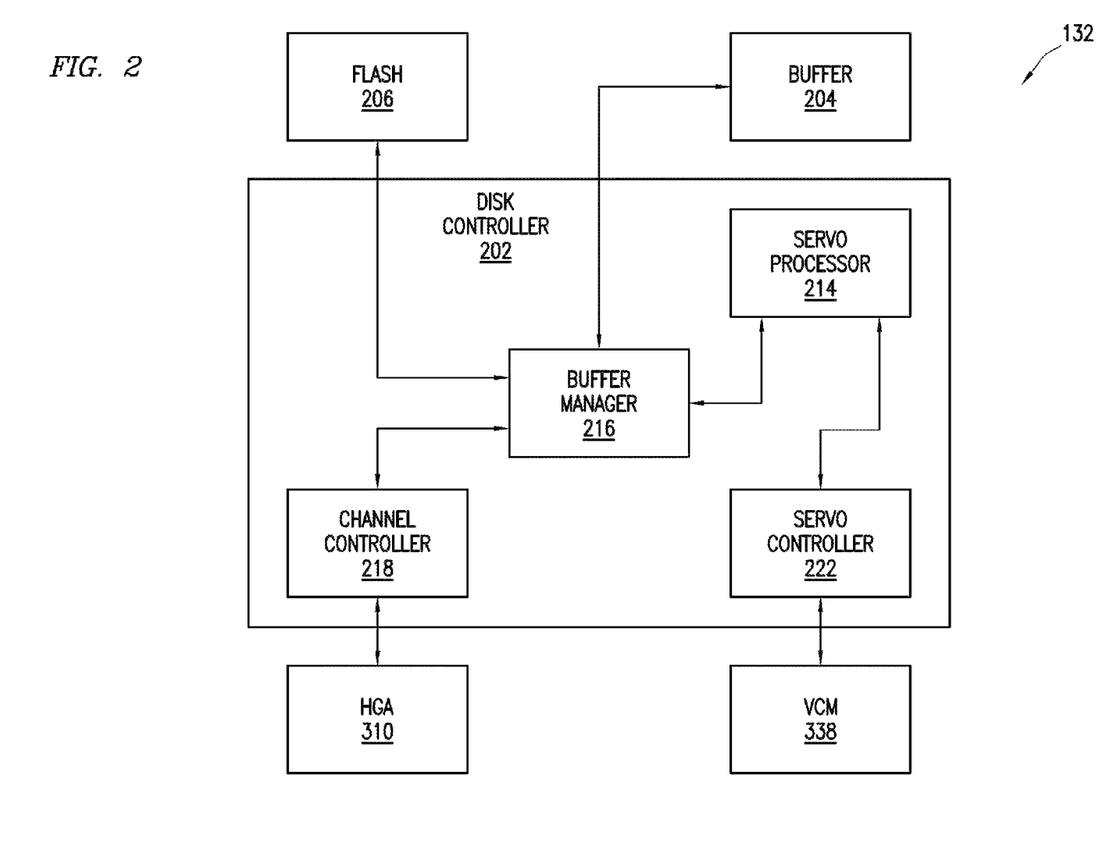
FIG. 2 illustrates an example block diagram of portions of a hard disk drive (HDD), in accordance with certain embodiments of the present disclosure.

FIG. 2 illustrates an example block diagram of portions of HDD 132, in accordance with certain embodiments of the present disclosure. HDD 132 may include disk controller 202, buffer 204, and/or flash 206. HDD 132 may also include head-gimbal assembly (HGA) 310 and/or voice control motor (VCM) 338 as discussed in detail with reference to FIG. 3. Components that provide for the operation of disk controller 202 may reside within electrical-connector block 364 and/or arm-electronics (AE) module 360 also shown in FIG. 3. In some embodiments, disk controller 202 may be communicatively coupled to processor 104, health monitor 114, and/or any other suitable component. Disk controller 202 may be, without limitation, a microprocessor, microcontroller, DSP, ASIC, or may be embodied by software and/or firmware configured to interpret and/or execute program instructions and/or process data related to controlling and/or monitoring HDD 132. Disk controller 202 may include servo processor 214, buffer manager 216, channel controller 218, and/or servo controller 222.

Flash 206 may include any suitable read only memory for storage of executable firmware and/or software for execution by disk controller 202. Flash 206 may be communicatively coupled to processor 104 and/or health monitor 114 and may include any system, device, or apparatus operable to retain program instructions or data for a period of time (e.g., computer-readable media). Flash 206 may include an EEPROM or any suitable selection and/or array of non-volatile memory that retains data after power to IHS 100 is removed.

Buffer 204 may include memory for storage of data and/or commands from host 102, processor 104, and/or health monitor 114 for execution by disk controller 202. Buffer 204 may be a memory such as dynamic RAM (DRAM) or any suitable selection and/or array of volatile memory.

Buffer manager 216 may be communicatively coupled to buffer 204 and flash 206. Buffer manager 216 may communicate read and/or write instructions to and/or from buffer 204 to servo processor 214 and channel controller 218. Buffer manager 216 may retrieve firmware for execution by servo processor 214 or channel controller 218.

Channel controller 218 may be coupled to HGA 310 and head 310a (shown in FIG. 3) via a read/write (R/W) channel and/or a pre-amplifier. Channel controller 218 may be utilized to convert an analog signal read by head 210a and amplified by a pre-amplifier to a signal read by processor 104, health monitor 114, and/or other suitable component via a host interface through electrical feedthroughs provided by housing 368. Channel controller 218, via buffer manager 216, may output a converted signal to processor 104, health monitor 114, and/or other suitable component. Also, when data is received from processor 104 and/or health monitor 114 through a host interface in a write mode, the data may be converted so that a write signal may be output to the pre-amplifier. The pre-amplifier may convert the write signal to a write current to be output through head 310a, shown in FIG. 3. Thus, processor 104, health monitor 114, and/or other suitable component may supply a control signal to channel controller 218 to read data from or to write data to a disk.

Servo processor 214 may be communicatively coupled to servo controller 222. Servo controller 222, may also be referred to as a VCM driver, and may supply drive current to VCM 338 to control the movement of head 310a, shown in FIG. 3. Servo controller 222 may be utilized to position head 310a over the desired track and reposition head 310a from one track to another as needed. The time needed to reposition head 310a and the position accuracy of head 310a may have a direct influence over HDD 132 performance and throughput.

In some embodiments, servo controller 222 may also be configured to measure and track the PES of head 310a. In operation, as discussed with reference to FIG. 3, the position of head 310a relative to the center of the desired track (e.g., track 376) may be sensed by servo controller 222. Servo controller 222 may generate the appropriate commands to VCM 338, which in turn moves head 310a in an effort to reduce the position error (e.g., lower the PES). Thus, for example, the PES may influence the electrical signal provided from servo controller 222 to VCM 338 (or voice coil 340) enabling head 310a to follow track 376. The PES may be a signal proportional to the relative difference between the position of the center of head 310a and the nearest track 376 center. Thus, the PES may be a periodic function of stationary and ideal track 376 center. The PES may include two sources of motion: motion of VCM 338 and motion of the surface of disk 320.

Figure 3:
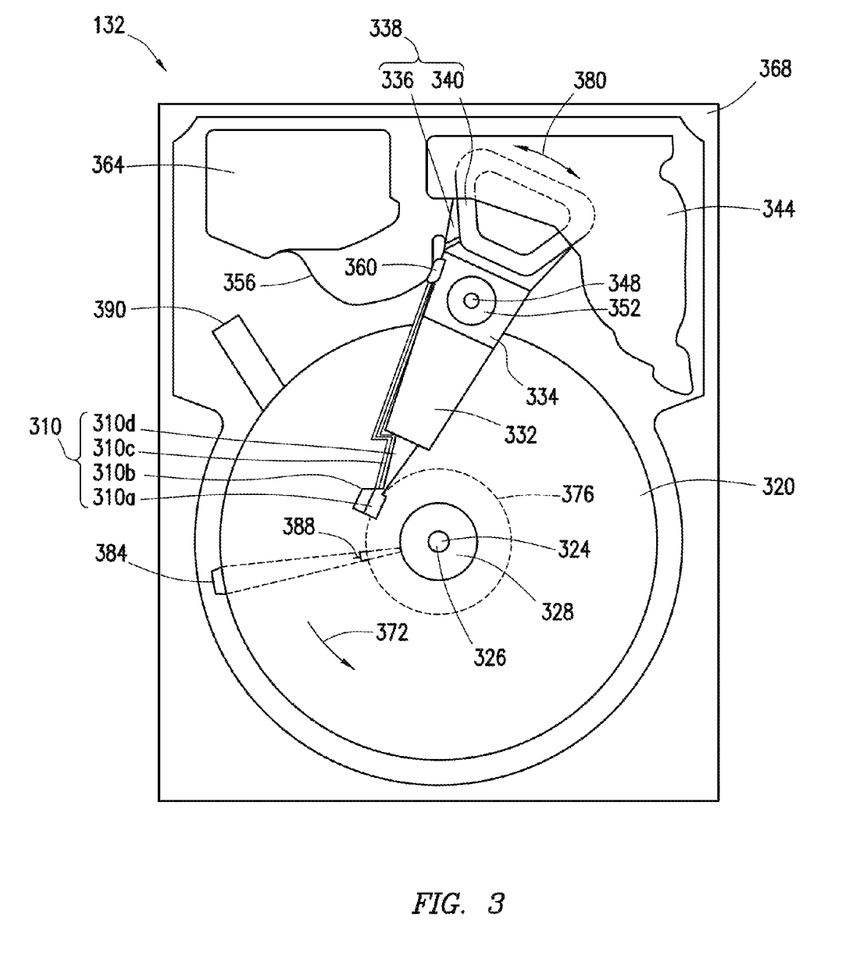
FIG. 3 illustrates an example HDD, in accordance with certain embodiments of the present disclosure.

FIG. 3 illustrates an example HDD 132, in accordance with certain embodiments of the present disclosure. FIG. 3 illustrates one potential arrangement of components of HDD 132. HDD 132 may include at least one HGA 310 that may include magnetic-recording head 310a, also referred to as a "head," lead suspension 310c coupled to head 310a, and load beam 310d coupled to slider 310b. In some embodiments, slider 310b may include head 310a.

In some embodiments, HDD 132 may also include at least one magnetic-recording disk 320, or "disk," rotatably coupled to spindle 324 and drive motor 326, also called a spindle motor (SPM), coupled to spindle 324 for rotating disk 320. Head 310a may include a write element, or "writer," and a read element, or "reader," for respectively writing and reading information stored on disk 320 of HDD 132. One or more disks 320 may be coupled to spindle 324 via clamp 328. Disk 320 may include a thin magnetic-recording medium on a surface facing head 310a. Information may be recorded in the thin-magnetic recording medium.

In some embodiments, HDD 132 further may include arm 332 coupled to HGA 310, carriage 334, and/or VCM 338. VCM 338 may include armature 336 with voice coil 340. Stator 344 may include a voice-coil magnet (not expressly shown). Armature 336 may be coupled to carriage 334. Armature 336 may be configured to move arm 332 and HGA 310 to access portions of one or more disks 320. Armature 336, carriage 334, and arm 332 may be mounted on pivot-shaft 348 with an interposed pivot-bearing assembly 352.

In some embodiments, signals may be provided by cable 356, which may be a flexible cable. Signals may include current to voice coil 340 and/or write signals to and read signals from head 310a. AE module 360 may communicatively connect cable 256 and head 310a. AE module 360 may include an on-board pre-amplifier (not expressly shown) for the read signal and/or other read-channel and write-channel electronic components. Cable 356 may also be coupled to electrical-connector block 364. Electrical-connector block 364 may provide electrical communication through electrical feedthroughs provided by housing 368. Housing 368, which may also be referred to as a "casting," in conjunction with an HDD cover (not expressly shown) may provide a sealed, protective enclosure for some or all of the components of HDD 132. Electrical-connector block 364 may house disk controller 202 discussed with reference to FIG. 2.

A signal may be provided to SPM 326 from disk controller 202, processor 104, and/or any other suitable component that may enable SPM 326 to spin, providing torque to spindle 324, which may be in turn transmitted to disk 320. As a result, disk 320 may spin in a direction, as indicated by arrow 372. Spinning disk 320 may create a cushion of air on the surface of disk 320 facing head 310a. The cushion of air may act as an air-bearing on which an air-bearing surface (ABS) of slider 310b rides. Thus, slider 310b may move over the surface of disk 320 without making contact with the thin magnetic-recording medium of disk 320. The signal that may be provided to voice coil 340 and/or VCM 338 may enable head 310a to access a track (e.g., track 376) on which information may be recorded. Thus, armature 336 may swing through arc 380 and may enable HGA 310 to access various tracks on disk 320. Head 310a may rest on load/unload platform 390 when head 310a may not be in use.

In some embodiments, information may be stored on disk 320 in a plurality of concentric tracks arranged in sectors on disk 320, for example, sector 384. Correspondingly, each track may be composed of a plurality of sectored track portions, for example, sectored track portion 388. Each sectored track portion 388 may be composed of recorded data and a header. The header may include a servo-burst-signal pattern, information that identifies track 376, and/or error correction code information. In accessing track 376, the read element of head 310*a* may read the servo-burst-signal pattern which provides the PES to the servo electronics. The PES may influence the electrical signal to VCM 338 (or voice coil 340) enabling head 310*a* to follow track 376. For example, the PES may provide a correction to head 310*a* based upon a proportion of the relative difference between the position of the center of head 310*a* and the center of the track attempting to be read, e.g., track 376. Thus, errors in position of head 310*a* may be accounted for through the use of the PES. Upon finding track 376 and identifying a particular sectored track portion 388, head 310*a* may either read data from track 376 and/or write data to track 376.

As noted with reference to FIG. 1, in operation, dynamic disturbances may impact the accuracy of reads from and/or writes to HDD 132. The impact of dynamic disturbances may include decreases in HDD 132 throughput performance. For example, as a disturbance occurs the surface of disk 320 may move relative to head 310*a* and/or head 310*a* may move relative to disk 320. Movement of either head 310*a* or disk 320 from a desired location may result in delays as head 310*a* attempts to read or write from the correct track on disk 320. Further, as HDDs increase in density with more tracks incorporated on disks 320, handling of dynamic disturbances in systems may become increasingly critical. Higher track densities may require increases in accuracy when searching for tracks 376 and the effects of dynamic disturbances may be more pronounced.

In some embodiments, rotational vibration (RV) may be the vibration introduced in the torque or moment during rotation of disk 320 around spindle 324. RV may be measured in radians per sec (rad/sec). Linear vibration (LV) may be the vibration introduced in the x, y, or z dimension relative to the disk 320. In HDD specifications, RV and LV may be independently managed to maintain high throughput. Accelerations of RV and LV may be captured via accelerometers or other on-board acceleration sensors proximate the base or case 368 of HDD 132, proximate a printed circuit board within HDD 132, and/or any other suitable location. Further, accelerometers or other on-board acceleration sensors may include RV/LV sensors and/or shock sensors. However, measurements of RV and LV in such a manner may not accurately correspond to the actual data throughput of HDD 132. Accordingly, on-board or external sensing devices (e.g., accelerometers) associated with HDD 132 may not be well positioned to sense the dynamic disturbances occurring relative to head 310*a* of HDD 132. Thus, there may be poor correlation between RV and LV and HDD 132 data throughput.

Accordingly, in some embodiments, the PES may be utilized to provide a more accurate measure of the impact of dynamic disturbances on HDD 132. The PES may be determined by applying an algorithm to data received from internal accelerometers located on or near disk controller 202 shown in FIG. 2. The accelerometers may detect the dynamic disturbances before the disturbance reaches head 310*a*.

As discussed with reference to FIG. 1, in some embodiments, a ranking may be made based upon location and performance of HDDs 132 and correlations may be made between location and performance. For example, HDDs 132 with a lower three sigma mean of PES may correlate to a higher throughput rate and HDDs with a higher three sigma mean may correlate to a lower throughput rate. By ranking the PES and the throughput rate of each of the HDDs 132 in HDD array 130 correlations may be made between, for example, the proximity of fans, the location of other HDDs 132, and/or the location of a particular slot in a chassis. The ranking may be utilized to improve the design of IHS 100. Such modifications or improvements may include, for example, adding stiffeners to the exterior of a particular HDD 132 by the addition of a stiffening material or the increase in thickness of an existing material. As another example, a modification may include positioning of more durable HDDs 132 in areas that experience relatively higher dynamic disturbances (e.g., exhibit a higher PES) within the chassis. A higher reliability HDD 132 may be positioned in the chassis in an area that may experience higher dynamic disturbances relative to other areas in the chassis, while a lower reliability HDD 132 may be positioned in an area that may experience lower dynamic disturbances relative to other areas in the chassis. As another example, a modification may include the positioning of slots to avoid mechanical resonances in the chassis. As yet another example, a modification may include adding dampeners to the mechanical structure of certain slots. Dampeners may include rubber grommets, rubber washers, and/or any other suitable dampening component. As another example, a modification may include modifying materials that are used to manufacture the chassis or HDDs 132 (e.g., incorporating less ductile materials during manufacture to improve resistance to vibration).

In some embodiments, a performance map of the HDDs 132 may be generated. The performance map may include generating a ranking of the performance of each HDD. For example, a ranking may be determined based on the PES three sigma mean of each HDD 132. The performance map may additionally include determining a performance location ranking of each HDD 132. For example, a location ranking may be determined based on the slot into which a particular HDD 132 is installed and/or some other aspect of the location of HDD 132, e.g., proximity to a fan. The performance map may indicate locations within a chassis that may be more susceptible to vibrations and/or other dynamic disturbances. Results of analysis of a performance map may lead to design and/or configuration improvements in a chassis, housing, number of HDDs 132 in HDD array 130, mounting method, mounting hardware, and/or any other suitable characteristic.

Thus, in some embodiments, the robustness of HDDs 132 in HDD array 130 may be diagnosed. A system may be designed such that specific RPM zones or ranges may be avoided by positioning and locating fans within a chassis. For example, a chassis may be designed to accommodate or withstand different dynamic disturbances through the use less ductile materials, use of stiffeners, and/or use of dampening agents, such as, rubber grommets. Further, use of the PES may improve determination of causes of throughput drop on one or multiple HDDs 132. For example, a particular HDD 132 throughput may be correlated to that particular HDD 132 PES, e.g., a drop in throughput may correspond to an increase in PES at a particular point in time. If a correlation exists, the root cause of the drop in throughput may be further defined or identified. For example, the turning on of a fan, increasing/decreasing the speed of a fan, and/or any other change in environment may be identified. Additionally, a correlation may be utilized to distinguish internal (e.g., within HDD 132) and external dynamic disturbances. For example, a correlation may be made between the PES data and data sensed by accelerometers external to HDD 132.

In some embodiments, the PES data for HDD 132 may be compared and/or correlated to fan dynamics in the frequency domain or spectrum domain. For example, the operation of fans, e.g., oscillating speed fans 124, constant speed fans 122, and/or entire fan system 120, may be monitored to determine oscillation frequencies, resonant frequencies, average RPM, RPM accelerations, and/or any other suitable dynamic characteristics of each fan and/or fan system 120. As an example, at a particular resonant frequency of vibration provided by a particular fan, the PES of a particular HDD near the fan may increase. This increase may indicate that the fan may be affecting the vibrations (or dynamic disturbances) experienced by the particular HDD. Results of correlation and/or analysis between fan dynamics and the PES of one or more HDDs 132 may lead to design and/or configuration modifications, such as changes in proximity between a particular HDD 132 and a particular fan.

Figure 4:
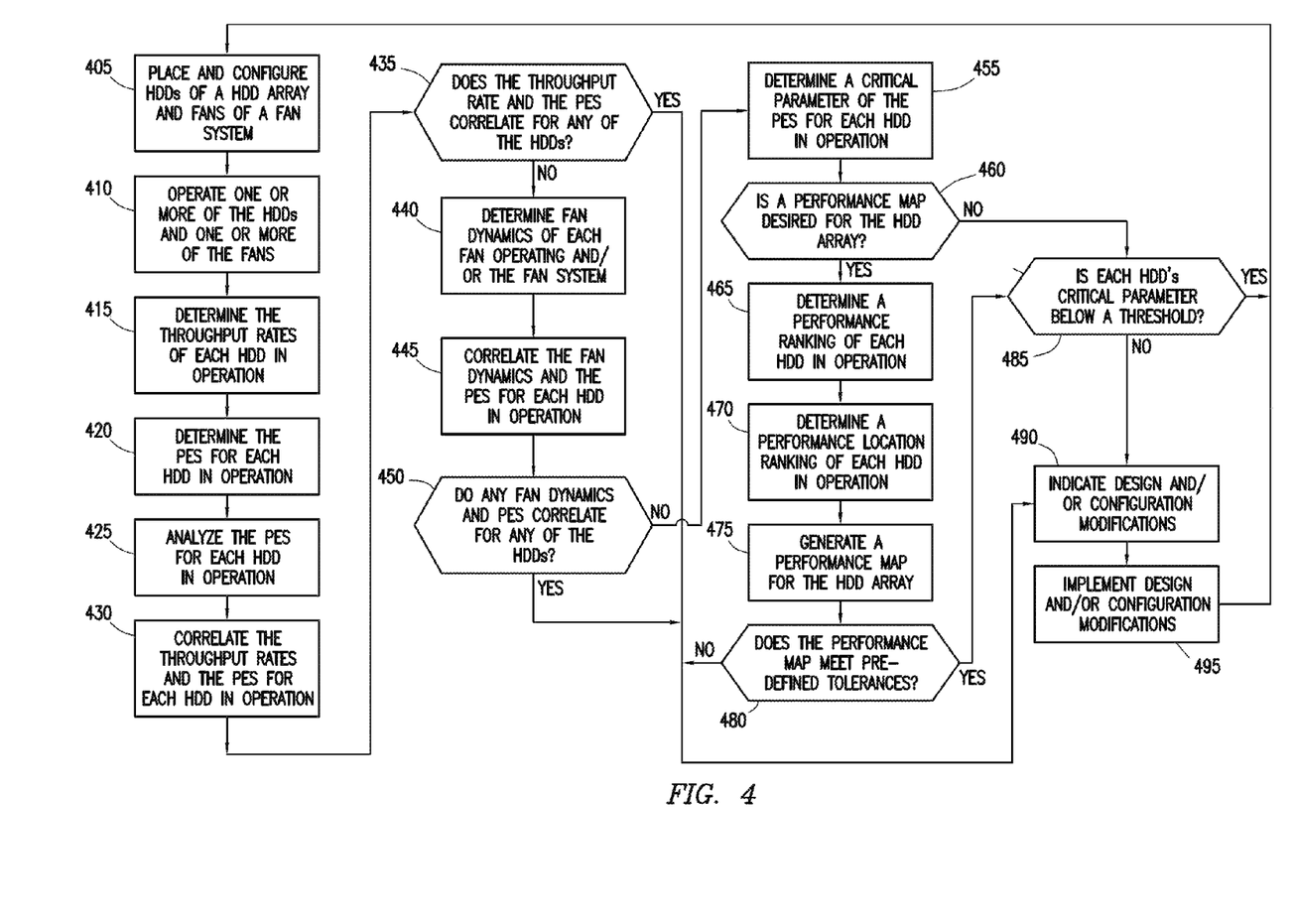
FIG. 4 illustrates a flow chart for an example method for HDD throughput optimization using position error signaling (PES), in accordance with certain embodiments of the present disclosure.

FIG. 4 illustrates a flow chart for an example method for HDD 132 throughput optimization using PES, in accordance with certain embodiments of the present disclosure. The steps of method 400 may be performed by various computer programs, models or any combination thereof. The programs and models may include instructions stored on a computer-readable medium that are operable to perform, when executed, one or more of the steps described below. The computer-readable medium may include any system, apparatus or device configured to store and/or retrieve programs or instructions such as a microprocessor, a memory, a disk controller, a compact disc, flash memory or any other suitable device. The programs and models may be configured to direct a processor or other suitable unit to retrieve and/or execute the instructions from the computer-readable medium. For example, method 400 may be executed by processor 104, health controller 114, disk controller 202, a user, and/or other suitable source. For illustrative purposes, method 400 may be described with respect to HDD 132 of FIGS. 1, 2 and 3; however, method 400 may be used for throughput optimization using PES of any suitable HDD.

Although FIG. 4 discloses a particular number of steps to be taken with respect to method 400, method 400 may be executed with greater or lesser steps than those depicted in FIG. 4. In addition, although FIG. 4 discloses a certain order of steps to be taken with respect to method 400, the steps comprising method 400 may be completed in any suitable order.

At step 405, method 400 may place and configure HDDs 132 in a HDD array, such as HDD array 130 shown in FIG. 1. Method 400 may additionally place and configure fans, e.g., oscillating speed fans 124 and/or constant speed fans 122, in a fan system, such as fan system 120.

At step 410, method 400 may operate one or more HDDs 132 and one or more fans 122 and 124. At step 415, method 400 may determine throughput rates for each HDD 132 in operation. The throughput rates may be determined for a specified period of time or on a continual basis by constant monitoring, periodic sampling, and/or any other suitable manner. For example, the throughput rates may be monitored and tracked for HDD 132*a* and 132*b* during operation of IHS 100 shown in FIG. 1. Further, increases or decreases in throughput may be noted and/or flagged for further investigation.

At step 420, method 400 may determine the PES for each of the HDDs 132 in operation. The PES may be determined for a specified period of time or on a continual basis by constant monitoring, periodic sampling, and/or any other suitable manner, such as discussed with reference to FIGS. 1-3. For example, the PES for a particular HDD 132*a*, shown in FIG. 1, may be monitored during operation of IHS 100. Further, increases or decreases in the PES may be noted and/or flagged for further investigation.

At step 425, method 400 may analyze the PES that was collected for each HDD 132 in operation. For example, a threshold may be set that may indicate an acceptable amount of correction or PES that ensures reliability of HDD 132 and associated data. Analysis of the PES may identify excursions above the threshold. Analysis of the PES may include generation of descriptive and/or analytical statistics such as mean, standard deviation, three sigma mean, distribution, variance, range, skewness, kurtosis, and/or any other suitable analysis may be performed.

At step 430, method 400 may correlate the throughput rates and the PES calculated for each HDD 132 in operation. Correlation may be accomplished with the use of any suitable correlation function and/or statistical methodology. For example, throughput of a particular HDD 132 may be correlated to that particular HDD 132 PES such that a drop in throughput may be shown to correspond to an increase in PES at a particular point in time.

At step 435, method 400 may determine if there is correlation between the throughput rate and the PES for any of the HDDs 132 in operation. If there is correlation between the throughput rate and the PES of any of the HDDs 132, then method 400 may proceed to step 490. If, however, there is no correlation between the throughput rate and the PES of any of the HDDs 132, method 400 may proceed to step 440.

At step 440, method 400 may determine fan dynamics of each fan operating and/or of the fan system. The fan dynamics may be characterized in the spectrum/frequency domain. For example, method 400 may monitor operation of fans, e.g., oscillating speed fans 124 and/or constant speed fans 122, and determine oscillation frequencies, resonant frequencies, average RPM, RPM accelerations, and/or any other suitable dynamic characteristics of each fan and/or the fan system.

At step 445, method 400 may correlate the fan dynamics and the PES determined for each HDD 132 in operation. Correlation may be accomplished with the use of any suitable correlation function and/or statistical methodology. For example, an increase in the RPM of one or more fans may be correlated in time to an increase in the PES for one or more HDDs 132. As another example, a particular RPM of one or more fans may correlate to an increase in the PES for one or more HDDs 132 and may indicate the generation of resonant vibrations or frequencies within HDDs 132 or the chassis.

At step 450, method 400 may determine if there is correlation between the fan dynamics and the PES for any of the HDDs 132 in operation. If there is correlation between the fan dynamics of each fan and/or the fan system and the PES of any of the HDDs 132, then method 400 may proceed to step 490. As another example, data from an accelerometer or other on-board acceleration sensor may be obtained and the PES may be correlated to the sensed acceleration data. If, however, there is no correlation between the fan dynamics of each fan, the fan system, and/or the sensed acceleration data and the PES of any of the HDDs 132, method 400 may proceed to step 455.

At step 455, method 400 may determine a critical parameter of the PES for each HDD 132 in operation. For example, with reference to FIG. 1, the PES three sigma mean may be determined for each of the HDDs 132. Other performance parameters may be determined based on descriptive statistics and/or other suitable analytical methodologies, such as such as mean, standard deviation, distribution, variance, range, skewness, and/or kurtosis.

At step 460, method 400 may determine if a performance map is desired for the HDD array, such as HDD array 130. For example, during a redesign of a chassis or a root cause investigation into a failure or reliability concern, generating a performance map by mapping characteristics of HDDs 132, e.g., HDD throughput and/or the PES, may indicate areas of a chassis that may be susceptible to relatively higher dynamic disturbances. If a performance map is desired for the HDD array 130, then method 400 may proceed to step 465. If no performance map is desired, method 400 may proceed to step 485.

At step 465, method 400 may determine a performance ranking of each HDD 132 in HDD array 130. For example, a ranking may be determined based on the PES three sigma mean of each HDD 132. As another example, a ranking may be determined based on the throughput of each HDD 132. At step 470, method 400 may determine a performance location ranking of each HDD 132. For example, a ranking may be determined based on the slot into which a particular HDD 132 is installed and/or some other aspect of the location of HDD 132, e.g., proximity to a fan.

At step 475, method 400 may generate a performance map for the HDD array 130. For example, a map may indicate locations within a chassis that may be more susceptible to vibrations and/or other dynamic disturbances. At step 480, method 400 may determine if the parameters defined in the performance map meet pre-defined tolerances. For example, a tolerance may be placed on the throughput of each HDD 132. If a particular HDD 132 falls below the tolerance, modifications may be made to the chassis and/or HDD to bring the throughput back into tolerance. If the parameters defined in the performance map meet pre-defined tolerances, method 400 may proceed to step 485. However, if the parameters defined in the performance map fail to meet pre-defined tolerances, method 400 may proceed to step 490.

At step 485, method 400 may determine if each HDD 132 critical parameter meets a pre-defined threshold. For example, if any of the HDDs 132 exceed a pre-defined threshold for the PES three sigma mean level, then method 400 may proceed to step 490. If, however, each particular HDD 132 critical parameter meets the pre-defined threshold, method 400 may return to step 405.

At step 490, method 400 may indicate a mechanical design or configuration modification is necessary. For example, modifications may include varying the type, thickness, and/or stability of mounting method for HDDs 132 and/or fans. Such modifications may include, for example, adding stiffeners to the exterior of a particular HDD 132 by the addition of a stiffening material or the increase in thickness of an existing material. As another example, a modification may include positioning of more durable HDDs 132 in areas that experience relatively higher dynamic disturbances (e.g., exhibit a higher PES) within the chassis. A higher reliability HDD 132 may be positioned in the chassis in an area that may experience higher dynamic disturbances relative to other areas in the chassis, while a lower reliability HDD 132 may be positioned in an area that may experience lower dynamic disturbances relative to other areas in the chassis. As another example, a modification may include the positioning of slots to avoid mechanical resonances in the chassis that may be generated by fans. As yet another example, a modification may include adding dampeners, e.g., rubber grommets or rubber washers, to the mechanical structure of certain slots. As another example, a modification may include modifying materials that are used to manufacture the chassis or HDDs 132, e.g., incorporating less ductile materials during manufacture to improve resistance to vibration). As another example, locations of fans may be modified to decrease the effects of fan dynamics on HDDs 132. At step 495, method 400 may implement any design or configuration improvements.

Modifications, additions, or omissions may be made to method 400 without departing from the scope of the present disclosure. For example, the order of the steps may be performed in a different manner than that described and some steps may be performed at the same time. For example, step 460 and step 485 may be performed simultaneously. Additionally, each individual step may include additional steps without departing from the scope of the present disclosure. For example, step 455 may be preformed before or after step 440 without departing from the scope of the present disclosure.

Although the present invention and its advantages have been described in detail, it should be understood that various changes, substitutions and alternations can be made herein without departing from the spirit and scope of the invention as defined by the following claims.

What is claimed is:

1. A method for throughput optimization of a hard disk drive (HDD) comprising:
   determining a position error signaling (PES) for a HDD mounted in a chassis based on a dynamic disturbance;
   calculating a critical parameter of the PES;
   determining a performance parameter for the HDD; and
   indicating a first mechanical design modification of the HDD or the chassis if the critical parameter of the PES exceeds a pre-defined threshold or if the performance parameter for the HDD fails to meet a pre-defined tolerance.

2. The method of claim 1, wherein the PES is a percent track offset.

3. The method of claim 1, wherein the critical parameter is a mean of the PES.

4. The method of claim 1, wherein the dynamic disturbance is from a fan associated with the chassis.

5. The method of claim 1, further comprising:
   correlating the PES to throughput of the HDD; and
   indicating a second mechanical design modification of the HDD or the chassis based on the correlation between the PES and the throughput of the HDD.

6. The method of claim 1, further comprising:
   correlating the PES to dynamics of a fan associated with the chassis; and
   indicating a second mechanical design modification of the HDD, the fan, or the chassis based on the correlation between the PES and the dynamics of the fan.

7. The method of claim 1, further comprising:
   identifying a location of the HDD in the chassis; and
   determining whether the dynamic disturbance at the location of the HDD in the chassis is higher than another dynamic disturbance at another location in the chassis.

8. The method of claim 1, further comprising:
   determining acceleration data for the HDD based on an on-board acceleration sensor; and
   correlating the PES to the acceleration data to detect another dynamic disturbance prior to the another dynamic disturbance causing another PES.

9. The method of claim 8, further comprising managing a rotational vibration or a linear vibration of the HDD in response to detecting the subsequent dynamic disturbance to reduce the subsequent PES.

10. A hard disk drive (HDD) comprising:
    a processor configured to:
    determine a PES for the HDD mounted in a chassis based on a dynamic disturbance;

calculate a critical parameter of the PES;
determine a performance parameter for the HDD; and
indicate a first mechanical design modification of the HDD or the chassis if the critical parameter of the PES exceeds a pre-defined threshold or if the performance parameter for the HDD fails to meet a pre-defined tolerance.

11. The HDD of claim 10, wherein the PES is a percent track offset.

12. The HDD of claim 10, wherein the critical parameter is a mean of the PES.

13. The HDD of claim 10, wherein the dynamic disturbance is from a fan associated with the chassis.

14. The HDD of claim 10, wherein the processor is further configured to:
   correlate the PES to throughput of the HDD; and
   indicate a second mechanical design modification of the HDD or the chassis based on the correlation between the PES and the throughput of the HDD.

15. The HDD of claim 10, wherein the processor is further configured to:
   determine acceleration data for the HDD based on an on-board acceleration sensor; and
   correlate the PES to the acceleration data to detect another dynamic disturbance prior to the another dynamic disturbance causing another PES.

16. An information handling system comprising:
   a processor;
   a hard disk drive (HDD) communicatively coupled to the processor; and
   a computer-readable medium communicatively coupled to the processor and having stored thereon instructions configured to, when executed by the processor:
      determine a PES for a HDD mounted in a chassis based on a dynamic disturbance;
      calculate a critical parameter of the PES;
      determine a performance parameter for the HDD; and
      indicate a first mechanical design modification of the HDD or the chassis if the critical parameter of the PES exceeds a pre-defined threshold or if the performance parameter for the HDD fails to meet a pre-defined tolerance.

17. The system of claim 16, wherein the critical parameter is a mean of the PES.

18. The system of claim 16, wherein the dynamic disturbance is from a fan associated with the chassis.

19. The system of claim 16, wherein the instructions are further configured to:
   correlate the PES to throughput of the HDD; and
   indicate a second mechanical design modification of the HDD or the chassis based on the correlation between the PES and the throughput of the HDD.

20. The system of claim 16, wherein the instructions are further configured to:
   correlate the PES to dynamics of a fan associated with the chassis; and
   indicate a second mechanical design modification of the HDD, the fan, or the chassis based on the correlation between the PES and the fan dynamics.

21. The system of claim 16, wherein the instructions are further configured to:
   determine acceleration data for the HDD based on an on-board acceleration sensor; and
   correlate the PES to the acceleration data to detect another dynamic disturbance prior to the another dynamic disturbance causing another PES.

* * * * *